UNITED STATES PATENT OFFICE.

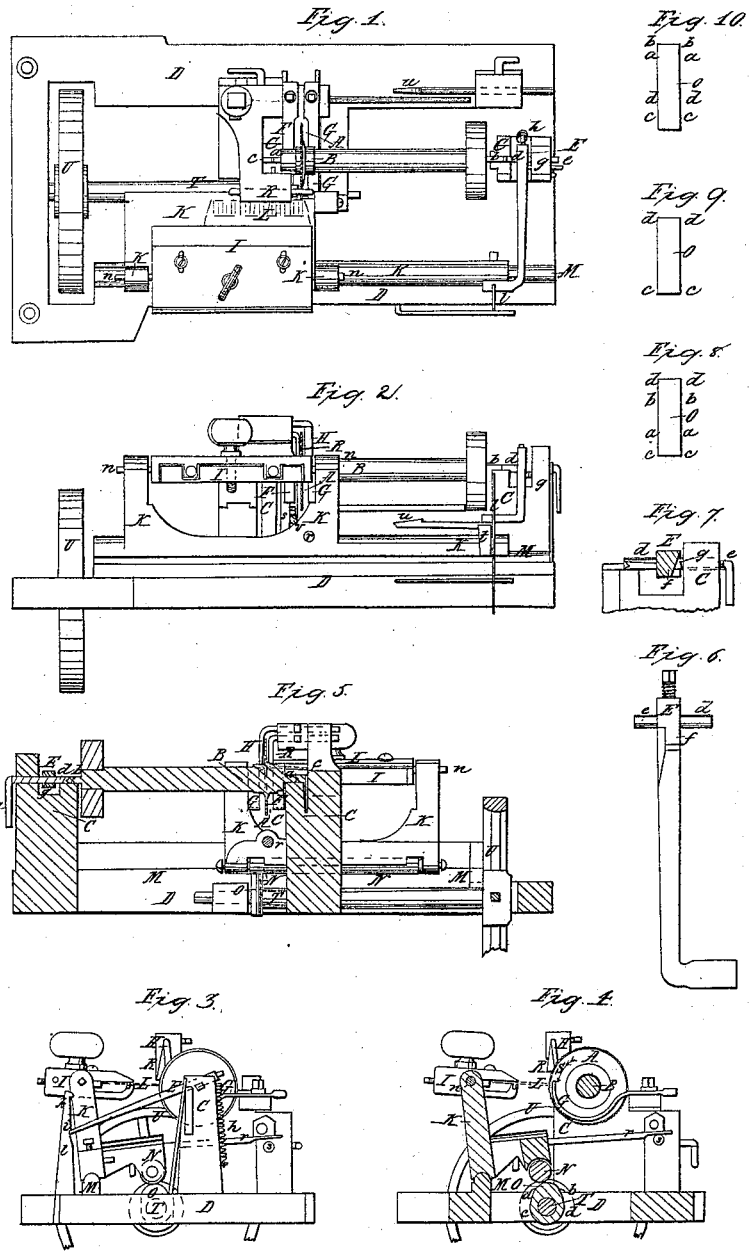

WILLIAM NOYES, JR., OF WEST NEWBURY, MASSACHUSETTS, ASSIGNOR TO S. C. NOYES & CO., OF WEST ROXBURY, MASSACHUSETTS.

MACHINERY FOR CUTTING COMB-TEETH.

Specification of Letters Patent No. 24,358, dated June 7, 1859.

*To all whom it may concern:*

Be it known that I, WILLIAM NOYES, Jr., of West Newbury, in the county of Essex and State of Massachusetts, have invented an improved machine for making or forming the teeth of fine-tooth combs when made from indurated vulcanized caoutchouc, gutta-percha, or a like material; and I do hereby declare that the same is fully described and represented in the following specification and the accompanying drawings, of which—

Figure 1, is a top view of the said machine. Fig. 2, an elevation of it. Fig. 3, an end elevation of it. Fig. 4, a vertical and transverse section taken through its screw cam. Fig. 5, is a longitudinal section taken through the saw shaft and so as to exhibit the screw cam—the rack, in which it operates and the parts in front of it.

In sawing plates of hard vulcanized caoutchouc, for the purpose of making fine comb teeth therein, the circular saw used has to be very thin. Its flexibility is so great that the saw is easily swerved out of its true course while cutting the material or making the first cut or kerf in the comb plate or blank. In other words, a small gritty particle in the material or a little springing of the saw, the bur on the teeth or some other cause sufficient to deflect the saw out of a straight line and make it to saw in a curve. As the curve is as liable to tend toward the middle of the comb blank, as to take an opposite direction, it will be readily seen, that when the next or second cut or kerf is made by the saw, it might fall into the first, at or near the base of the first tooth and either entirely or nearly sever the tooth from the blank. Should the first cut of the saw swerve any from the middle of the comb blank while the saw may be entering it, the first tooth when made would be a little wider at the base than would be necessary. This however would not be so objectionable as a curve of the kerf in opposite direction, as the latter tends either to weaken the first tooth at its base or to entirely separate it from the blank, 'thus materially injuring the comb. In order to cause the saw to cut in a straight line, it is necessary to have applied to it some means of controlling it or bending in such degree or to such extent as to make it take the path that may be desirable should it tend to swerve therefrom. It is found that this control of the saw is not necessary, generally speaking, after the first kerf may be cut, as owing to the narrowness of the comb teeth formed by the kerf, each tooth will be flexible enough to prevent the saw from swerving out of a straight path. The great point is to make the first kerf straight. This having been done, all the rest can be made so with little or no difficulty. But, should this not always be the case, my invention affords the means of correcting the error, at any time during the carrying on of the process of forming the teeth of the comb.

The nature of my invention consists in combining with the saw or the same and its peripheral guide or guides a means or mechanism by which the saw may be pressed or bent laterally or otherwise moved or controlled so as to be made to cut in a straight path or kerf when there is any tendency of it to swerve therefrom.

My invention further consists in a mode of producing the movements of the comb blank carrier both toward and away from the saw, in its plane and laterally, or at a right angle with respect to it the same being by means of a cam and a screw formed on its periphery and made to operate with a rack applied to the carriage of the comb blank carrier.

In the drawings A, denotes a thin circular saw, mounted on an arbor, B, whose journals are seen at *a*, *b*. Each of such journals is conical on its end and is supported by one of the standards or posts C, C, extending upward from the bed plate or frame D. The conical end of the journal, *a*, enters or rests against a spring, *c*, while the other journal, (*b*) rests against the end of a stud, *d*, extended from the side of a lever, E, which turns in a vertical plane on a fulcrum, *e*, and has a cam or beveled surface on one side of it, as shown at *f*, in Fig. 6, which is an underside view of the lever. This cam surface is also shown in Fig. 7, which is a transverse section of the lever and exhibits the conical pointed screw, *g*, against which the cam surface, *f*, rests. A spring, *h*, applied to the shorter arm serves to elevate the tail or longer arm of such lever after it may have been depressed. The saw at or near its periphery should run between two or more guides, F, G, H, arranged as shown in the drawings, or otherwise suitably applied to it. By pressing downward the tail end of the lever, E, the arbor of the saw will be moved longitudinally so as to press the saw against one of the guides and cup or spring the saw more or less, the lever being caught by the lower notch, j, of a spring catch, l, after its tail may have described the proper distance. The said spring catch arranged as shown in the drawings has a projection or notch, k, at top, for estopping the tail of the lever when in a horizontal position.

In the drawings, I, exhibits the comb blank carrier it being a clamp or vise arranged within the carriage, K, and supported on centers n, n, so as to be capable of being vibrated therein either toward or away from the saw. The comb blank is held in the carrier in the position shown at L, by red lines. The carriage K, is supported on a long rail, M, projecting upward from the bed plate the upper surface of such rail being semi cylindrical as shown in the drawings, and so as to enable the carriage not only to be capable of being tipped in transverse directions on the rail, but of being moved longitudinally thereon.

A round rack, N, having very fine teeth is affixed to the carriage K, as shown in the drawings. This rack rests on a cam, O, whose periphery is grooved to receive the rack teeth, or is provided with a thread to enter between the same. The coils of the threads, for a short arc, a b, (see Figs. 8, 9, and 10,) are helical, or curved like a screw thread, while on the larger arc, a c, d b, they run parallel to the side of the cam, each coil by its helical bend being made to run into that which is next to it. The form of the periphery of the cam is such as to move the carriage, K, so as to carry the comb blank against and force it away from the saw in manner so as to enable the saw to form a kerf in the blank, and the said blank to be retracted sufficiently beyond the saw for the carriage K, to be moved longitudinally far enough for the saw to form the next kerf in the blank. The cam therefore, by its action on the rack will not only impart the necessary motions of the comb blank toward and away from the saw, but will move such blank longitudinally a short distance preparatory to the formation of each kerf.

In the drawings, R, denotes a rest for the comb blank to extend under and be supported against, while the saw may be in operation on it, the direction of the rotary movement of the saw being indicated by the arrow S, (see Fig. 4).

The cam, O, is fixed on a shaft, T, carrying a driving pulley, V. An arm, r, and a stud, s, serve to determine the position of the carriage K, for the first kerf to be sawed. The arm extends from the carriage while the stud projects from the frame of the machine in the position as shown in the drawings.

Preparatory to the first kerf being made in the comb blank, the tail of the lever, E, should be depressed and be held down by the lower notch of the spring catch, l. A projection, t, on the carriage K, will by the movements of the carriage, be forced against the spring catch so as to detach the lever preparatory to the formation of the second kerf. Finally, on completion of the last kerf of the series in the blank, the arm, r, will be received on an inclined plane u (arranged as shown in the drawings) and by it will be lifted so high as to raise the rack, N, out of engagement with the cam, O, so as to arrest further movement of the carriage.

With the said machine, vulcanized or hard india rubber comb blanks, can be sawed to excellent advantage.

I claim—

1. In combination with the saw or the same and its peripheral, guide or guides, a mechanism or means of pressing or bending the saw laterally substantially as and for the purpose specified.

2. I also claim the mode of producing the lateral and longitudinal movements of the carriage of the comb carrier, viz, by means of the cam, and its screw thread periphery arranged and operating in conjunction with a rack applied to the said carriage, substantially as herein before described.

In testimony whereof I have hereunto set my signature.

WM. NOYES, Jr.

Witnesses:
PATRICK CRONIN,
JOHN C. CARR.